United States Patent
Nakayama

(10) Patent No.: US 12,292,114 B2
(45) Date of Patent: May 6, 2025

(54) SEALING STRUCTURE AND ASSEMBLING METHOD OF SEALING STRUCTURE

(71) Applicant: NOK CORPORATION, Tokyo (JP)

(72) Inventor: Kenichi Nakayama, Ibaraki (JP)

(73) Assignee: NOK CORPORATION, Tokyo (JP)

( * ) Notice: Subject to any disclaimer, the term of this patent is extended or adjusted under 35 U.S.C. 154(b) by 10 days.

(21) Appl. No.: 18/025,784

(22) PCT Filed: Oct. 6, 2021

(86) PCT No.: PCT/JP2021/036940
§ 371 (c)(1),
(2) Date: Mar. 10, 2023

(87) PCT Pub. No.: WO2022/107472
PCT Pub. Date: May 27, 2022

(65) Prior Publication Data
US 2023/0349467 A1    Nov. 2, 2023

(30) Foreign Application Priority Data

Nov. 20, 2020  (JP) .................. 2020-193761

(51) Int. Cl.
*F16J 15/10*    (2006.01)
*F02M 55/00*    (2006.01)

(52) U.S. Cl.
CPC .......... *F16J 15/102* (2013.01); *F02M 55/005* (2013.01); *F02M 2200/858* (2013.01)

(58) Field of Classification Search
CPC ........ F16J 15/102; F16J 15/104; F16J 15/106; F16J 15/10; F16J 15/441; F16J 15/06
See application file for complete search history.

(56) References Cited

U.S. PATENT DOCUMENTS 8,304,119 B2 * 11/2012 Kurano ............... H01M 8/0271
                                                        422/500
10,746,145 B1 * 8/2020 Rondeau ................ F02M 61/14
(Continued)

FOREIGN PATENT DOCUMENTS

DE       3414693 A1 *  1/1985  ............. F16J 15/062
EP     2 080 893         7/2009
(Continued)

OTHER PUBLICATIONS

International Search Report issued in International Patent Application No. PCT/JP2021/036940, dated Dec. 21, 2021, along with an English translation thereof.
(Continued)

*Primary Examiner* — Eugene G Byrd
*Assistant Examiner* — L. Susmitha Koneru
(74) *Attorney, Agent, or Firm* — GREENBLUM & BERNSTEIN, P.L.C.

(57) ABSTRACT

A sealing structure capable of providing consistent sealing performance for a prolonged time, and an assembling method of the sealing structure. An installation component is provided with an annular fitting groove in which a resin gasket is mounted. The fitting groove has a bottom with an annular projection including a tapered surface increasing in a diameter thereof from a pressure side to a non-pressure side, and a tapered surface decreasing in a diameter thereof from the pressure side to the non-pressure side. The tip of the annular projection is positioned closer to the pressure side than a center in a width direction of the fitting groove.

7 Claims, 9 Drawing Sheets

(56) References Cited

U.S. PATENT DOCUMENTS

| | | | |
|---|---|---|---|
| 2002/0162538 A1 | 11/2002 | Krause et al. | |
| 2002/0179057 A1 | 12/2002 | Reiter et al. | |
| 2004/0080115 A1 | 4/2004 | Tsuchiya et al. | |
| 2005/0016501 A1 | 1/2005 | Krause et al. | |
| 2014/0174653 A1* | 6/2014 | Babcanec | B29C 66/861 |
| | | | 156/293 |
| 2015/0035237 A1* | 2/2015 | Tadano | F02M 61/16 |
| | | | 277/591 |

FOREIGN PATENT DOCUMENTS

| | | |
|---|---|---|
| EP | 2 607 679 | 6/2013 |
| JP | 2003-536019 | 12/2003 |
| JP | 2004-506135 | 2/2004 |
| JP | 2005-226517 | 8/2005 |
| JP | 2006-170379 | 6/2006 |
| JP | 3830896 | 10/2006 |
| JP | 2013-174287 | 9/2013 |

OTHER PUBLICATIONS

Extended European Search Report issued in EP Application No. 21894347.0, dated Sep. 6, 2024.

\* cited by examiner

SEALING STRUCTURE AND ASSEMBLING METHOD OF SEALING STRUCTURE

TECHNICAL FIELD

The present invention relates to a sealing structure having a resin gasket, and an assembling method of the sealing structure.

BACKGROUND ART

In a section of an engine where an injector is mounted to a cylinder head, a resin gasket is provided to prevent leakage of high-pressure combustion gas through an annular gap between a mounting hole, which is formed in the cylinder head, and the injector. For example, a gasket made of PTFE, which is excellent in heat resistance and pressure resistance, is preferably used. However, such a gasket gradually deteriorates in sealing ability due to creep that develops with prolonged use and increased thermal shrinkage over time. A known technique provides a tapered surface that increases in the diameter thereof from a high-pressure side to a low-pressure side on a groove bottom of the groove for mounting the gasket provided to the injector, so as to reduce the size of the gap gradually from the high-pressure side toward the low-pressure side (see PTL 1). By adopting such a configuration, the sealing performance can be maintained even after the gasket has suffered advanced heat shrinkage over time, due to an automatic sealing effect elicited when the pressure of combustion gas is applied.

However, even with such a configuration, after creep has progressed in the gasket, a gap develops between the outer circumferential surface of the gasket and the inner circumferential surface of the mounting hole in a low-temperature environment. This gap gradually grows wider over time, because of which a gradual decline in sealing performance is inevitable. This makes a gasket capable of providing consistent sealing performance for a prolonged time even more desirable.

CITATION LIST

Patent Literature

[PTL 1]
Japanese Patent No. 3830896

SUMMARY OF INVENTION

Technical Problem

An object of the present invention is to provide a sealing structure capable of providing consistent sealing performance for a prolonged time, and an assembling method of the sealing structure.

Solution to Problem

The present invention adopts the following means to achieve the object noted above.

Namely, the sealing structure of the present invention is a sealing structure including:
a mounting destination member having a mounting hole;
an installation component installed in the mounting hole; and
a cylindrical resin gasket disposed in an annular gap between the mounting hole and the installation component thereby providing sealing between a pressure side where pressure is high due to presence of a sealed fluid and a non-pressure side opposite therefrom, wherein
the installation component is provided with an annular fitting groove in which the resin gasket is mounted, and
the fitting groove has a bottom with an annular projection including a tapered surface increasing in a diameter thereof from the pressure side to the non-pressure side, and a tapered surface decreasing in a diameter thereof from the pressure side to the non-pressure side, the annular projection having a tip positioned closer to the pressure side than a center in a width direction of the fitting groove.

According to the present invention, when pressure acts on the resin gasket from the pressure side, the resin gasket is pressed radially outward by the normal force from the tapered surface that increases in a diameter thereof from the pressure side to the non-pressure side, whereby an automatic sealing effect is created. The tip of the annular projection being located closer to the pressure side than the center in the width direction of the fitting groove can prevent formation of a gap between the outer circumferential surface of the gasket and the inner circumferential surface of the mounting hole particularly in an area close to the pressure side. This means that any gap formed between the outer circumferential surface of the gasket and the inner circumferential surface of the mounting hole can be narrowed in an area close to the pressure side in a low-temperature environment even when creep has progressed in the gasket. With the gap between the outer circumferential surface of the gasket near the pressure side and the inner circumferential surface of the mounting hole being narrower, sealed fluid leakage can be prevented better compared to when there is a wider gap.

The resin gasket may preferably be mounted at a position close to the pressure side within the fitting groove, and a clearance is provided between a side wall surface on the non-pressure side of the fitting groove and the resin gasket in a state in which no pressure is acting from the pressure side.

This clearance can prevent the normal force acting on the resin gasket against the pressure from the pressure side from being divided, i.e., can increase the normal force on the resin gasket from the tapered surface that increases in a diameter thereof from the pressure side to the non-pressure side, to ensure that the automatic sealing effect is fully achieved.

The fitting groove may preferably have a side wall surface constituted of a surface perpendicular to a center axis of the resin gasket on the pressure side.

This can increase the work efficiency of mounting the resin gasket into the fitting groove.

The assembling method of the sealing structure of the present invention includes:
a step of mounting the resin gasket in the fitting groove such that, after the resin gasket is fitted onto the installation component from the pressure side, the resin gasket is slid toward the fitting groove up to a position where an end face, which is on the pressure side, of the resin gasket passes a side wall surface, which is on the pressure side, of the fitting groove; and
a step of installing the installation component having the resin gasket mounted thereon in the mounting hole of the mounting destination member.

The resin gasket can be mounted in the fitting groove by fitting the resin gasket onto an installation component, and after that, by sliding the resin gasket toward the fitting groove. As the resin gasket is slid, the tip of the resin gasket abuts on the tapered surface of the annular projection provided in the fitting groove. This tapered surface configured to increase in a diameter thereof from the pressure side to the non-pressure side allows the resin gasket to be slid smoothly from the pressure side to the non-pressure side. In the case where the fitting groove has a side wall surface perpendicular to the center axis of the resin gasket on the pressure side, the resin gasket, when the end face on the pressure side of the resin gasket passes the side wall surface on the pressure side of the fitting groove, is freed from the resistance from the side wall surface and fits into the fitting groove. This way, the resin gasket can be set in the predetermined position within the fitting groove easily.

The configurations described above can be adopted in any possible combinations.

Advantageous Effects of Invention

As described above, according to the present invention, consistent sealing performance can be provided for a prolonged time.

DESCRIPTION OF EMBODIMENT

Hereinafter, modes for carrying out this invention will be illustratively described in detail based on a specific embodiment with reference to the drawings. It should be noted that, unless otherwise particularly specified, the sizes, materials, shapes, and relative arrangement or the like of constituent components described in the embodiment are not intended to limit the scope of this invention.

Below, one example will be described in which the mounting destination member to which an installation component is installed is a cylinder head of an engine, and the installation component is an injector that is mounted to a mounting hole formed in the cylinder head. The sealing structure according to this embodiment can favorably be applied to a fuel injection device, in particular, equipped in a gasoline direct injection engine. Not to mention, the present invention is applicable not only to cylinder heads but to any sealing structures that seal an annular gap between a mounting hole formed in a member exposed to a high-pressure sealed fluid (mounting destination member) and various installation components installed in this mounting hole.

EMBODIMENT

Figure 1:
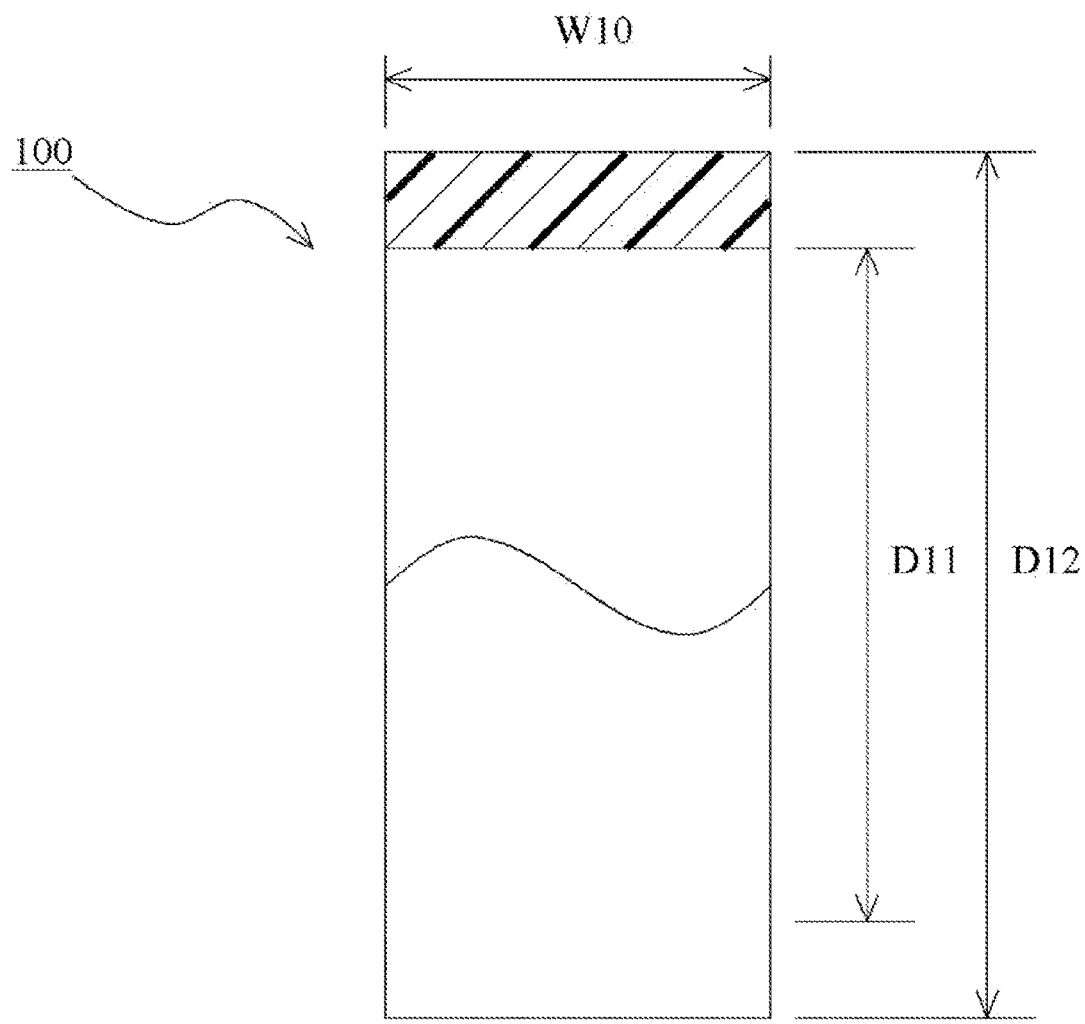
FIG. 1 is a schematic configuration diagram of a resin gasket according to an embodiment of the present invention.
Figure 2:
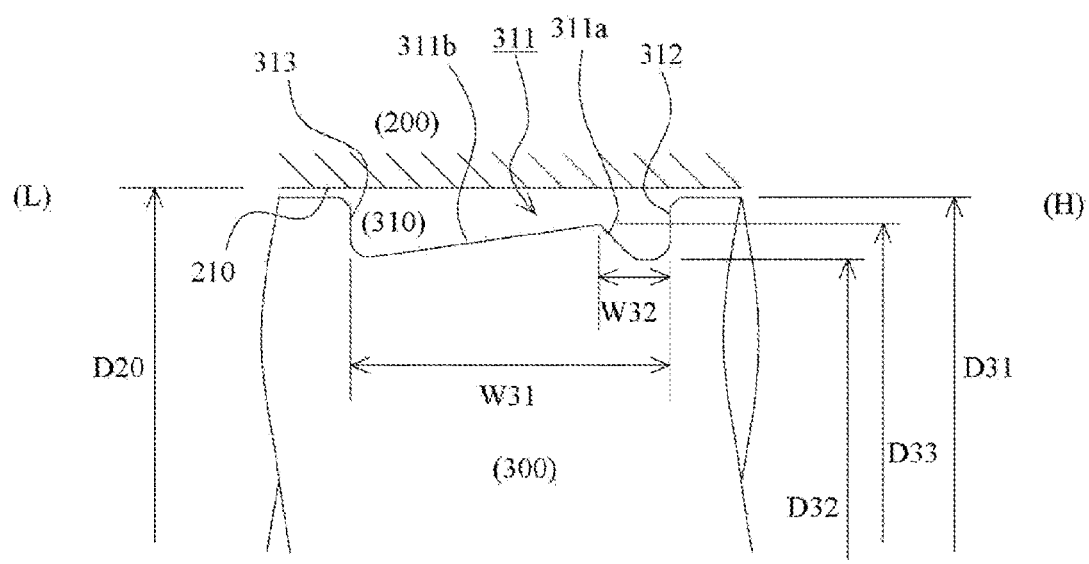
FIG. 2 is a schematic configuration diagram of a mounting destination member and an installation component, according to the embodiment of the present invention.
Figure 3:
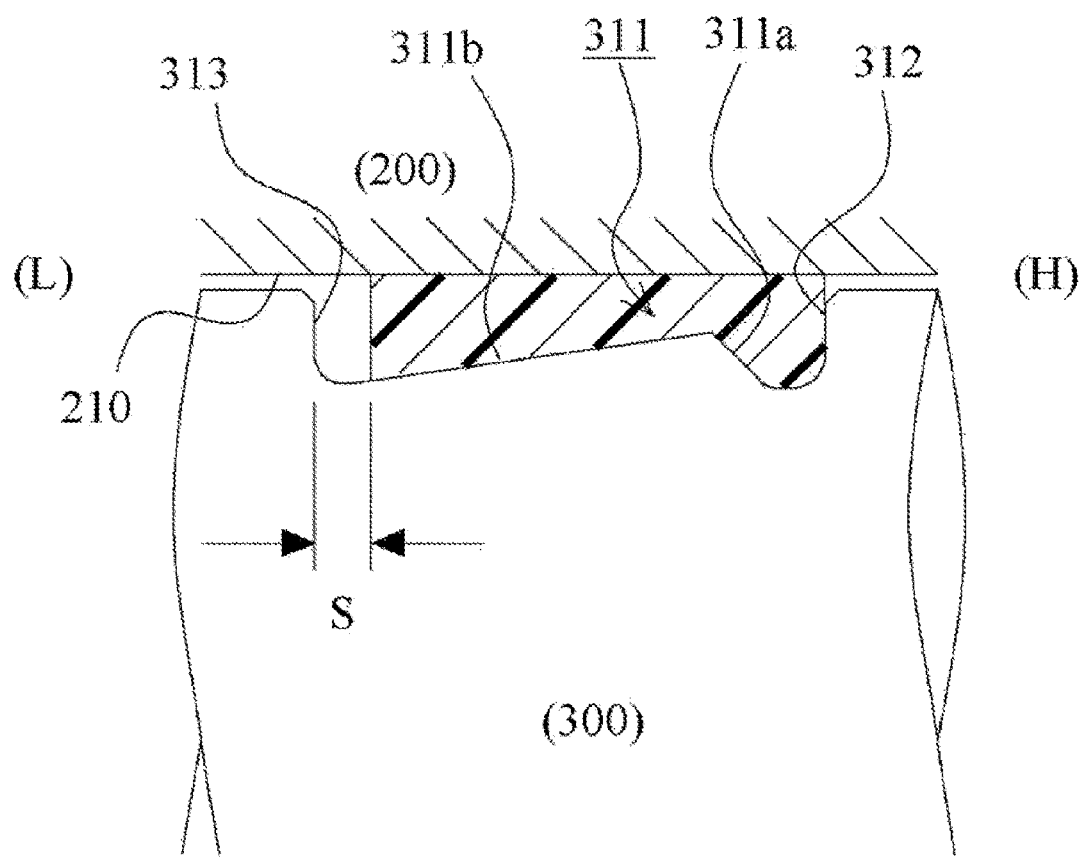
FIG. 3 is a diagrammatic cross-sectional view of a sealing structure according to the embodiment of the present invention.

A sealing structure and an assembling method of the sealing structure according to one embodiment of the present invention are described with reference to FIG. 1 to FIG. 9. FIG. 1 is a schematic configuration diagram of a resin gasket according to the embodiment of the present invention, illustrating (in the upper half of the drawing) a partially broken cross section of a partially cut away resin gasket. FIG. 2 is a schematic configuration diagram of a mounting destination member and an installation component according to the embodiment of the present invention, illustrating, in a diagrammatic cross-sectional view, a schematic configuration of the sealing structure in which the resin gasket is not shown. FIG. 3 is a diagrammatic cross-sectional view of the sealing structure according to the embodiment of the present invention. FIG. 4 is an illustrative diagram of a method of mounting a resin gasket to an installation component, illustrating, in a diagrammatic cross-sectional view, how a resin gasket is mounted to the installation component. FIG. 5 is a schematic configuration diagram of an evaluation test device. FIG. 6 to FIG. 9 are graphs showing the evaluation test results of the sealing structure according to the embodiment of the present invention.

<Resin Gasket>

A resin gasket (hereinafter referred to as gasket 100) according to this embodiment is described with reference, in particular, to FIG. 1. The gasket 100 according to this embodiment is a cylindrical member. The gasket 100 has a rectangular cross-sectional shape when cut in a plane containing the center axis of the gasket 100. Polytetrafluoroethylene (PTFE), which has excellent heat resistance and pressure resistance, is favorably applicable to the gasket 100. Shrinkage at lower temperatures of gaskets 100 produced from PTFE can be minimized by mixing 20 vol % or more of a filler. Leakage of a sealed fluid (which corresponds to a combustion gas generated by combustion inside an engine cylinder in this embodiment) through a gap between the sealed surfaces can be reduced by selecting a filler to be added that has a particle size of not greater than 20 μm.

<Mounting Destination Member and Installation Component>

A mounting destination member 200 and an installation component 300 according to this embodiment are described with reference, in particular, to FIG. 2. The mounting destination member 200 (cylinder head in this embodiment) is provided with a cylindrical mounting hole 210. The installation component 300 (injector in this embodiment) mounted in this mounting hole 210 is provided with an annular fitting groove 310 in which the gasket 100 is mounted. The right side of FIG. 2 (and FIG. 3 and FIG. 4) is the high-pressure side (hereinafter referred to as the pressure side (H)) where the pressure of the sealed fluid (combustion gas) rises during the use of the system (engine in this embodiment), and the left side is the opposite side (hereinafter referred to as the non-pressure side (L)). The gasket 100 disposed in the annular gap between the mounting hole 210 and the installation component 300 serves the purpose of providing a seal between the pressure side (H) and the opposite non-pressure side (L).

The fitting groove 310 in the installation component 300 has an annular projection 311 at the bottom. This annular projection 311 is made up of a tapered surface increasing in the diameter thereof from the pressure side (H) to the non-pressure side (L) (conical surface that appears straight when viewed in cross section) 311a, and a tapered surface 311b decreasing in the diameter thereof from the pressure side (H) to the non-pressure side (L). The tapered surface 311a closer to the pressure side (H) is configured to have a larger taper angle than that of the tapered surface 311b closer to the non-pressure side (L), and the former is configured to have a shorter axial length (in the direction along the center axis of the installation component 300) than that of the latter. The taper angle here refers to an angle made by two lateral face lines of a vertical cross section of a cone. The tip of the annular projection 311 (boundary between the tapered surface 311a and tapered surface 311b) is positioned closer to the pressure side (H) than the center in the width direction of the fitting groove 310. While the boundary between the tapered surface 311a and the tapered surface 311b in the illustrated example is not chamfered, it may optionally be rounded or chamfered.

The fitting groove 310 has a side wall surface 312 that is perpendicular to the center axis of the gasket 100 on the pressure side (H). Similarly, the side wall surface 313 of the fitting groove 310 on the non-pressure side (L) is formed as a surface perpendicular to the center axis of the gasket 100. This side wall surface 313 on the non-pressure side (L) may be formed as a tapered surface or a slope. In this embodiment, the tapered surface 311a of the annular projection 311 is connected with the side wall surface 312 on the pressure side (H) via a curved surface, and the tapered surface 311b of the annular projection 311 is connected with the side wall surface 313 on the non-pressure side (L) via a curved surface, too.

<Relationships Between Dimensions of Various Members>

The relationships between dimensions of various parts that make up the sealing structure will be described. The width in the direction along the center axis of the gasket 100 is denoted by W10, the inside diameter of the gasket 100 is denoted by D11, and the outside diameter of the gasket 100 is denoted by D12 (see FIG. 1). The inside diameter of the mounting hole 210 of the mounting destination member 200 is denoted by D20 (see FIG. 2). The groove width of the fitting groove 310 (width in the direction along the center axis) is denoted by W31, and the distance between the side wall surface 312 on the pressure side (H) of the fitting groove 310 to the tip of the annular projection 311 (boundary between the tapered surface 311a and tapered surface 311b) is denoted by W32. The outside diameter outside and near the fitting groove 310 of the installation component 300 is denoted by D31, the smallest outside diameter at the bottom of the fitting groove 310 is denoted by D32, and the outside diameter at the tip of the annular projection 311 is denoted by D33 (see FIG. 2).

These dimensions satisfy D11<D32<D33<D12<D31<D20, and W32<W10<W31. This embodiment adopts a configuration that satisfies D12<D31<D20. However, because of the relationship D11<D32<D33 being satisfied, when the gasket 100 is mounted in the fitting groove 310, the gasket 100 radially expands so that the outer circumferential surface of the gasket 100 makes tight contact with the inner circumferential surface of the mounting hole 210.

<Sealing Structure>

The sealing structure according to this embodiment is described with reference, in particular, to FIG. 3. The gasket 100, when mounted in the fitting groove 310, seals the annular gap between the mounting hole 210 and the installation component 300. With the relationships between dimensions satisfied as described above, the gasket 100 is pressed radially outward by the annular projection 311 provided in the fitting groove 310, as well as pressed radially inward by the inner circumferential surface of the mounting hole 210, so that the gasket is compressed radially. There is formed a clearance S between the side wall surface 313 of the fitting groove 310 on the non-pressure side (L) and the gasket 100. In this embodiment, the gasket 100 is mounted at a location closer to the pressure side (H). Namely, the gasket 100 is mounted in the fitting groove 310 such that the midpoint of the width in the direction along the center axis of the gasket 100 is positioned closer to the pressure side (H) than the midpoint of the width of the fitting groove 310. Various components should preferably be dimensioned such that the above clearance S will be maintained when pressure is applied from the pressure side (H) in operating conditions.

<Assembling Method of Sealing Structure>

An assembling method of the sealing structure according to this embodiment is described with reference, in particular, to FIG. 4. The assembling method according to this embodiment includes a step of mounting the gasket 100 in the fitting groove 310 of an installation component 300, and a step of attaching the installation component 300 with the gasket 100 mounted thereon in the mounting hole 210 of the mounting destination member 200. The former step is described in more detail below.

Figure 4A:
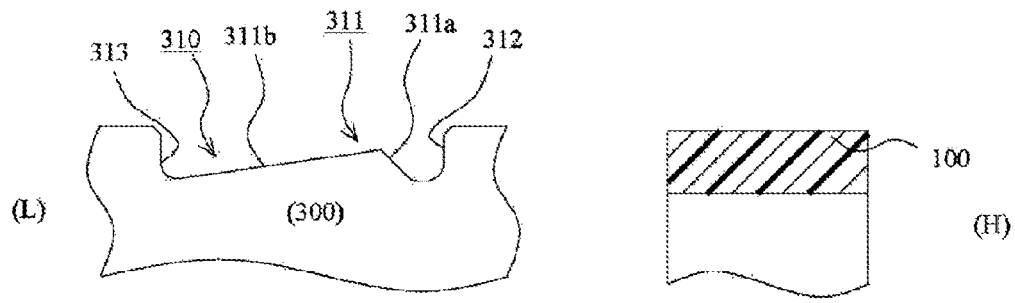
FIGS. 4A, 4B, 4C, and 4D are illustrative diagrams of a method of mounting a resin gasket to an installation component.
Figure 4B:
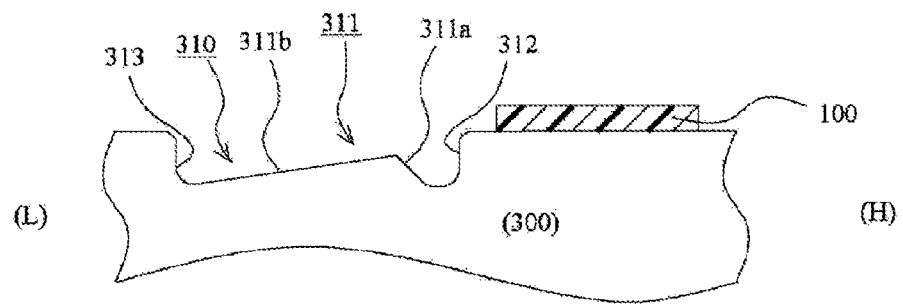
Figure 4C:
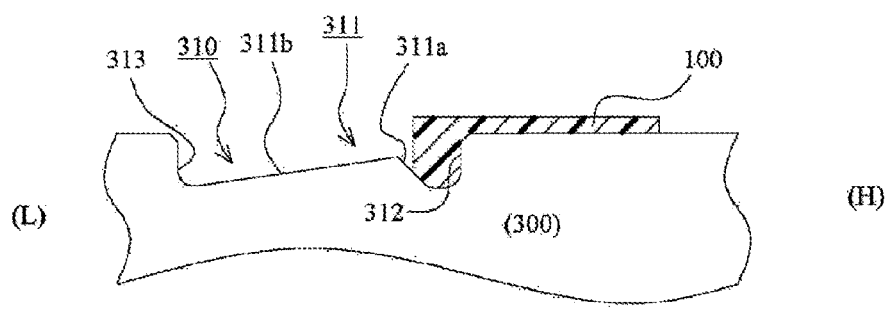
Figure 4D:
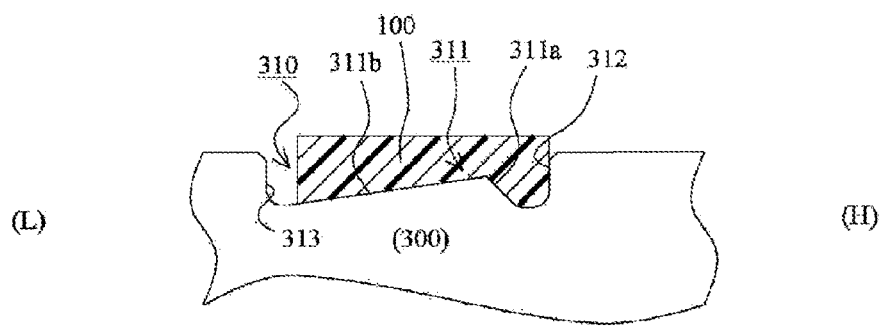
Figure 5:
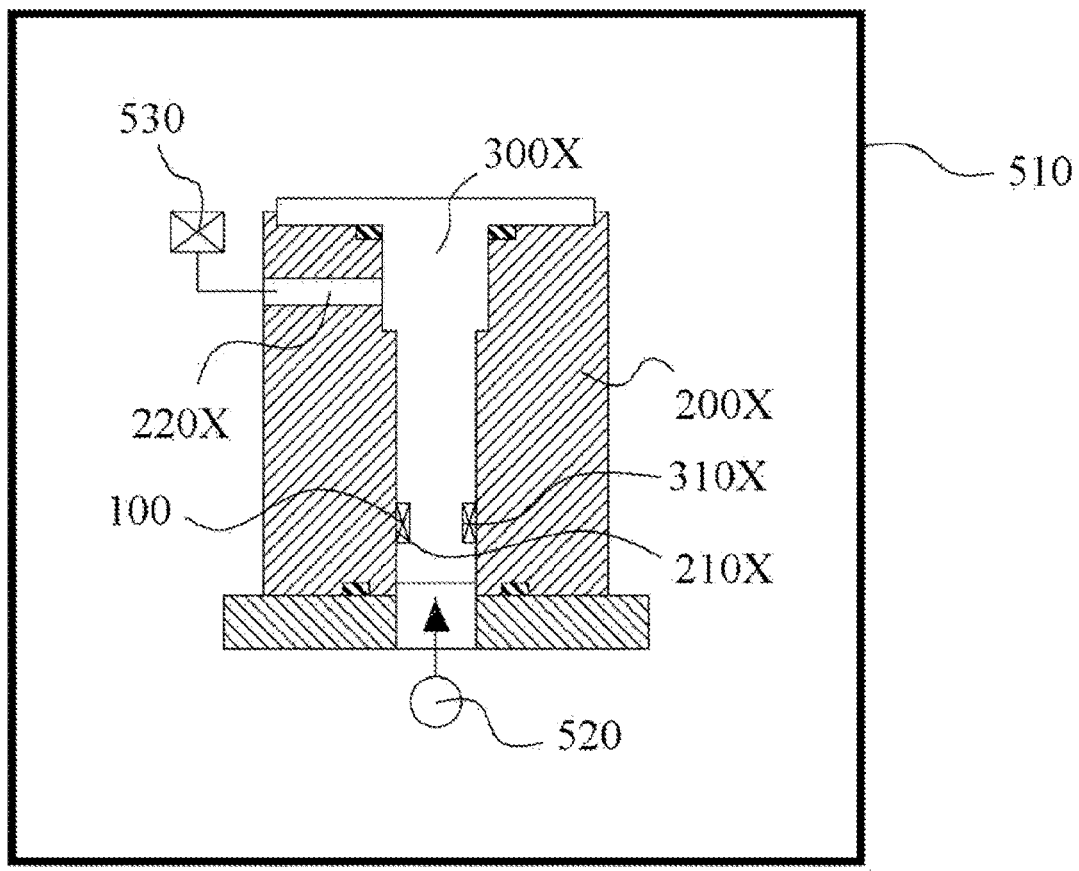
FIG. 5 is a schematic configuration diagram of an evaluation test device.

First, the installation component 300 and the gasket 100 are positioned coaxially (see FIG. 4(a)), and the gasket 100 is fitted onto the installation component 300 from the pressure side (H) (see FIG. 4(b)). After that, the gasket 100 is slid toward the fitting groove 310. In this process, the tip of the gasket 100 slides against the tapered surface 311a of the annular projection 311 (see FIG. 4(c)). When the end face on the pressure side (H) of the gasket 100 passes the side wall surface 312 on the pressure side (H) of the fitting groove 310, the gasket 100 radially shrinks by elastic recovery and fits in the fitting groove 310 (see FIG. 4(d)). When the gasket 100 is mounted, the side face on the pressure side (H) of the gasket 100 may be in tight contact with the side wall surface 312 of the fitting groove 310, or there may be a clearance.

<Advantages of the Sealing Structure and Assembling Method of Sealing Structure According to this Embodiment>

According to this embodiment, when pressure acts on the gasket 100 from the pressure side (H), the gasket 100 is pressed radially outward by the normal force from the tapered surface 311a, whereby an automatic sealing effect is created. Namely, the gasket 100 is compressed between the tapered surface 311a and a portion of the inner circumferential surface of the mounting hole 210 opposite the tapered surface 311a, which creates the automatic sealing effect. The gasket 100 is also restricted from moving toward the non-pressure side (L).

In this embodiment, there is formed a clearance S between the side wall surface 313 of the fitting groove 310 on the non-pressure side (L) and the gasket 100. This clearance can prevent the normal force acting on the gasket 100 against the pressure from the pressure side (H) from being divided, i.e., can increase the normal force on the gasket 100 from the tapered surface 311a, to ensure that the automatic sealing effect is fully achieved. To explain this in more detail, let us assume a case where the gasket 100 is disposed in the fitting groove 310 in contact with the side wall surface 313 on the non-pressure side (L). In this case, the normal force acting on the gasket 100 against the pressure from the pressure side (H) would mostly be generated by the side wall surface 313. Accordingly, the normal force generated by the tapered surface 311a would be smaller. In this case, therefore, the automatic sealing effect achieved by compression of the gasket between the tapered surface 311a and a portion of the inner circumferential surface of the mounting hole 210 opposite the tapered surface 311a would be compromised as compared to the case with the embodiment.

As described above, the sealing structure of the present invention can provide consistent sealing performance for a prolonged time because of the automatic sealing feature fully taking effect even after the gasket 100 develops creep and suffers progressive thermal shrinkage over time after a long use.

The fitting groove 310 of this embodiment is configured to have a side wall surface 312 on the pressure side (H) perpendicular to the center axis of the gasket 100, and adopts a configuration in which there is formed a clearance S between the side wall surface 313 of the fitting groove 310 on the non-pressure side (L) and the gasket 100. This can increase the work efficiency of mounting the gasket 100 into the fitting groove 310, as has been explained in the foregoing in the description of the assembling method of the sealing structure.

Moreover, in this embodiment, the tip of the annular projection 311 is positioned closer to the pressure side (H) than the center in the width direction of the fitting groove 310. This can prevent formation of a gap between the outer circumferential surface of the gasket 100 and the inner circumferential surface of the mounting hole 210 particularly in an area close to the pressure side (H). This means that any gap formed between the outer circumferential surface of the gasket 100 and the inner circumferential surface of the mounting hole 210 in a low-temperature environment due to progressed creep in the gasket 100 can be narrowed in an area close to the pressure side (H). With the gap between the outer circumferential surface of the gasket 100 near the pressure side (H) and the inner circumferential surface of the mounting hole 210 being narrower, sealed fluid leakage can be prevented better compared to when there is a wider gap. A further explanation will be provided in this regard based on the evaluation test described below.

An evaluation test (leak test) on the gasket according to this embodiment and the evaluation test results will be described below with reference to FIG. 5 to FIG. 9. As shown in FIG. 5, the evaluation test device includes a constant-temperature tank 510, mounting destination member equipment 200X replicating the structure in the vicinity of a mounting hole of a cylinder head, installation component equipment 300X replicating an injector, a pump 520 that feeds nitrogen gas, and a flow meter 530 that measures the leak rate. The leak rate of sealed fluid (combustion gas) in a system in which an injector is installed in a cylinder head can be evaluated by conducting an evaluation test using this evaluation test device.

The mounting destination member equipment 200X is provided with a mounting hole 210X. The installation component equipment 300X is provided with a fitting groove 310X in which a gasket 100 is to be mounted. In the evaluation test, the installation component equipment 300X having a gasket 100 mounted in the fitting groove 310X is installed in the mounting hole 210X. In this state, pressurized nitrogen gas is supplied from the pump 520 into the mounting hole 210X, and the flow rate of nitrogen gas leaking from a lateral hole 220X formed in the mounting destination member equipment 200X is measured using the flow meter 530 to determine the leak rate.

In the evaluation test, pressurized nitrogen gas (14 MPa) is supplied into the mounting hole 210X for a predetermined time, with the temperature inside the constant-temperature tank 510 being set at 230° C. so that creep progresses sufficiently in the gasket 100 made of PTFE. The temperature inside the constant-temperature tank 510 is then set at −40° C., and while nitrogen gas is being supplied at 8 MPa into the mounting hole 210X, the leak rate is measured. The temperature is set to −40° C. based on a lower limit of a temperature range of an actual operating environment.

The evaluation test was conducted on the installation component equipment 300X in each of the following cases: a conventional example where the fitting groove 310X is provided at the bottom only with a tapered surface increasing in the diameter thereof from the high-pressure side to the low-pressure side (see description in the background art); a comparative example in which an annular projection 311 is provided at the center in width of the fitting groove (where W32/W31=0.5, see FIG. 2); and this embodiment in which the annular projection 311 is positioned closer to the high-pressure side (H) (W32/W31=0.2, see FIG. 2).

The result in the case with the conventional example was the leak rate at low temperature being about 3000 cc/min. In contrast, the leak rate at low temperature was about 60 cc/min in the case with the comparative example, and there was hardly any leak at low temperature in the case with this embodiment. The following reasons are considered to explain the difference in the leak rate between the comparative example and this embodiment. The gap between the outer circumferential surface of the gasket 100 and the inner circumferential surface of the mounting hole 210X in a state with fully developed creep in the gasket 100 is narrowest (or absent) near the tip of the annular projection 311 and gradually increases away from the tip of the annular projection 311 along the axial direction. The wider this gap is on the pressure side (H), the more easily the gas leaks. Since this gap on the pressure side (H) can be made narrower in the case with this embodiment, the leak rate was reduced compared to the comparative example.

The above evaluation test was conducted using samples with varying dimensions of various parts of the gasket 100 and annular projection 311 to verify preferable dimensions of various parts. The results of verification are described below. The reference dimensions for the samples used in the evaluation test are as follows. W10, D11, and D12 of the gasket 100 in FIG. 1 are 3.09 mm, 4.68 mm, and 5.97 mm, respectively. The inside diameter D20 of the mounting hole 210X is 6.2575 mm. W31, W32, D31, D32, and D33 of the annular groove 310X in FIG. 2 are 3.7 mm, 0.74 mm, 5.975 mm, 4.89 mm, and 5.175 mm, respectively.

Figure 6:
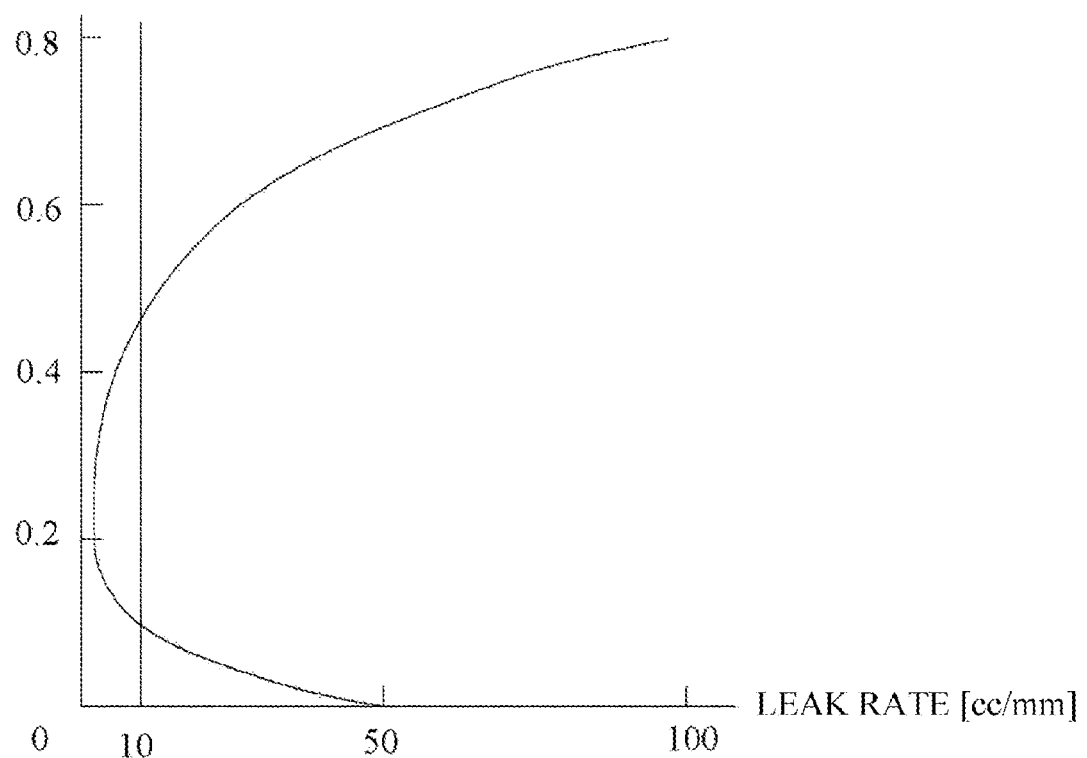
FIG. 6 is a graph showing the evaluation test results of the sealing structure according to the embodiment of the present invention.

To verify the relationship between the position of the tip of the annular projection 311 and the leak rate, the evaluation test was performed on a plurality of samples (installation component equipment 300X) with varying positions of the tip of the annular projection 311 (varying W32/W31). The evaluation test was carried out using samples having the same measurements (as the above reference dimensions) except for W32/W31, which was varied by changing the taper angles of the tapered surface 311a and tapered surface 311b. FIG. 6 is a graph showing the evaluation results, the horizontal axis representing the leak rate [cc/min] at low temperature and the vertical axis representing W32/W31.

The evaluation results showed that W32/W31 should be approximately 0.1 or more and 0.45 or less to meet the requirement for the leak rate (not greater than 10 cc/min) of satisfactory quality level.

Figure 7:
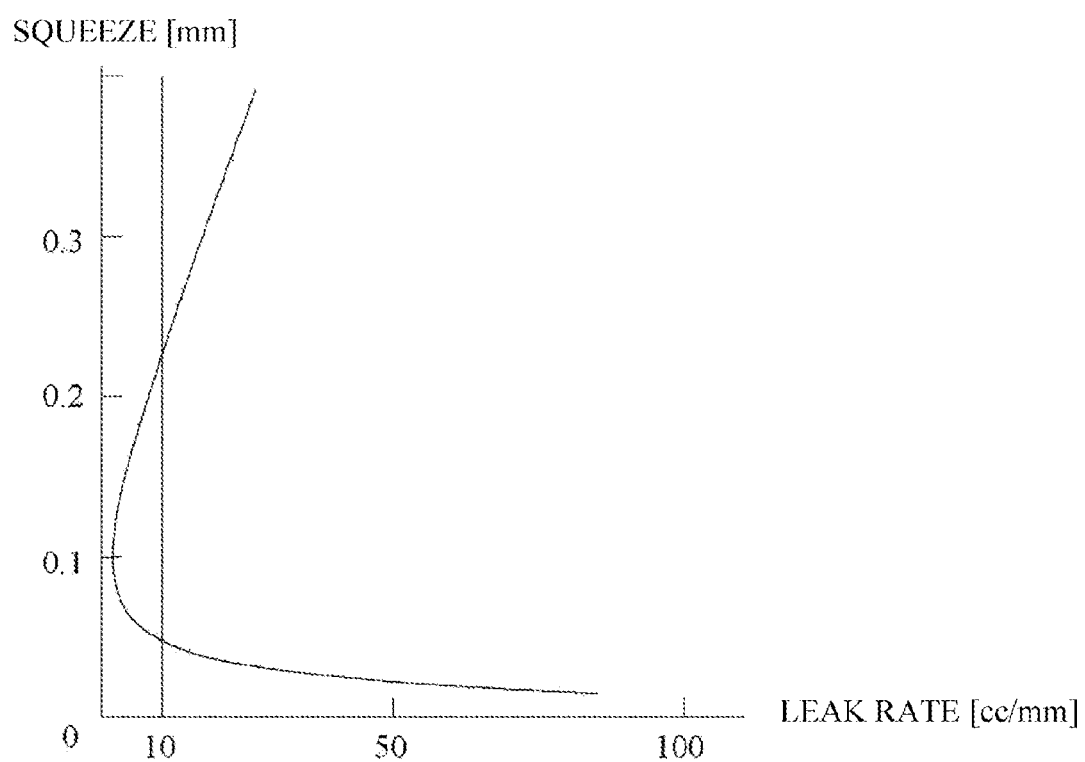
FIG. 7 is a graph showing the evaluation test results of the sealing structure according to the embodiment of the present invention.

Further, to verify the relationship between the squeeze of the gasket 100 and the leak rate, the evaluation test was conducted on a plurality of samples varying only in the outside diameter D12 of the gasket 100. The "squeeze" here corresponds to a value obtained by subtracting a minimum clearance in the part where the gasket 100 is mounted from the thickness of the gasket 100. Therefore, the "squeeze" equals to (D12–D11)/2–(D20–D33)/2 (see FIG. 1 and FIG. 2). FIG. 7 is a graph showing the evaluation results, the horizontal axis representing the leak rate [cc/min] at low temperature and the vertical axis representing the squeeze. The evaluation results showed that the squeeze should be approximately 0.05 mm or more and 0.23 mm or less to meet the requirement for the leak rate (not greater than 10 cc/min) of satisfactory quality level.

Figure 8:
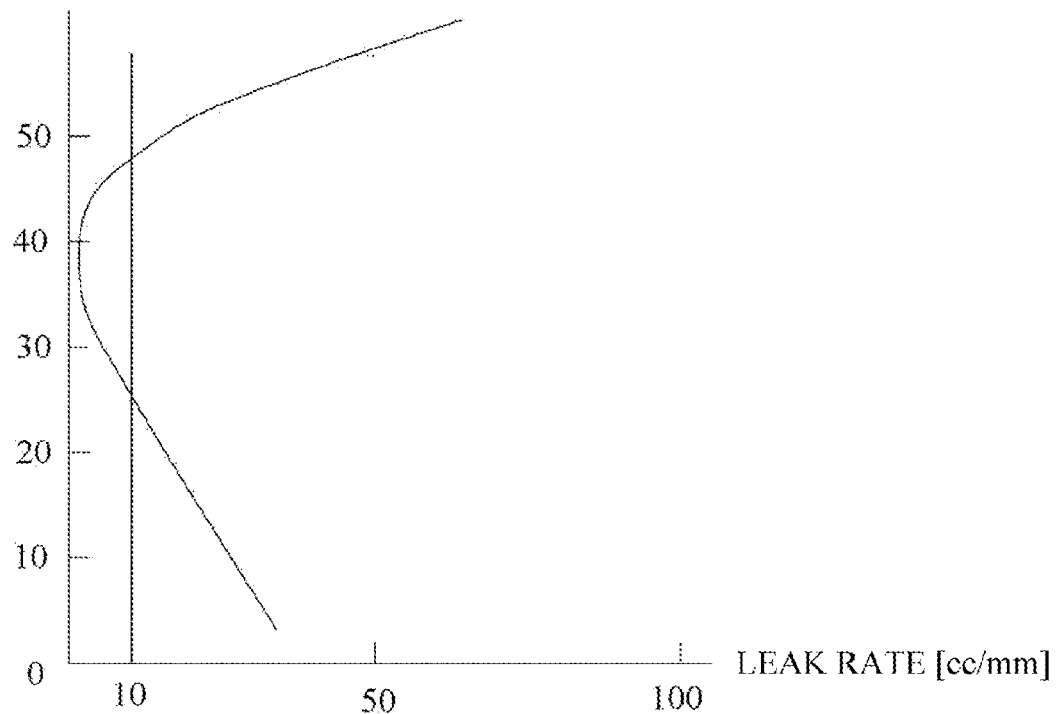
FIG. 8 is a graph showing the evaluation test results of the sealing structure according to the embodiment of the present invention.

Further, to verify the relationship between the taper angle of the tapered surface 311a on the pressure side (H) of the annular projection 311 and the leak rate, the evaluation test was conducted on a plurality of samples varying in this taper angle. The evaluation test was carried out using a plurality of samples having the same W31, W32/W31 (=0.2), and D33, and varying in D32, i.e., in the taper angle of the tapered surface 311a (see FIG. 2). FIG. 8 is a graph showing the evaluation results, the horizontal axis representing the leak rate [cc/min] at low temperature and the vertical axis representing the taper angle. The evaluation results showed that taper angle should be approximately 25° or more and 48° or less to meet the requirement for the leak rate (not greater than 10 cc/min) of satisfactory quality level.

Figure 9:
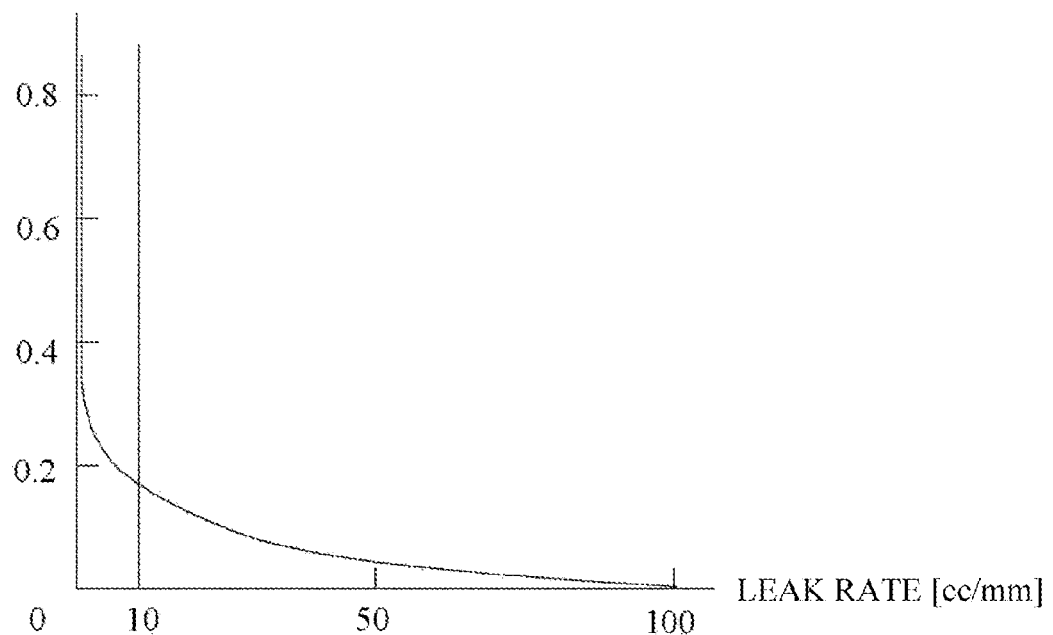
FIG. 9 is a graph showing the evaluation test results of the sealing structure according to the embodiment of the present invention.

Furthermore, to verify the relationship between the clearance S formed between the side wall surface 313 on the non-pressure side (L) of the fitting groove 310 and the gasket 100 (clearance when no fluid pressure is acting) and the leak rate when the fluid pressure is acting, the evaluation test was conducted on a plurality of samples varying in size in the axial direction (W10) of the gasket 100. The annular projection 311 was designed so that W32/W31=0.2. FIG. 9 is a graph showing the evaluation results, the horizontal axis representing the leak rate [cc/min] at low temperature and the vertical axis representing the clearance S. The evaluation results showed that the clearance S should be approximately 0.17 mm or more to meet the requirement for the leak rate (not greater than 10 cc/min) of satisfactory quality level.

REFERENCE SIGNS LIST

100 Gasket
200 Mounting destination member
200X Mounting destination member equipment
210, 210X Mounting hole
220X Lateral hole
300 Installation component
300X Installation component equipment
310, 310X Fitting groove
311 Annular projection
311a (Pressure side) tapered surface
311b (Non-pressure side) tapered surface
312 (Pressure side) side wall surface
313 (Non-pressure side) side wall surface
510 Constant-temperature tank
520 Pump
530 Flow meter
S Clearance

The invention claimed is:

1. A sealing structure comprising:
   a mounting destination member having a mounting hole;
   an installation component installed in the mounting hole; and
   a cylindrical resin gasket disposed in an annular gap between the mounting hole and the installation component thereby providing sealing between a pressure side where pressure is high due to presence of a sealed fluid and a non-pressure side opposite therefrom,
   wherein
   the installation component is provided with an annular fitting groove in which the cylindrical resin gasket is mounted, and
   the fitting groove has a bottom with an annular projection including a first linearly tapered surface increasing in a diameter thereof from the pressure side to the non-pressure side, and a second linearly tapered surface decreasing in a diameter thereof from the pressure side to the non-pressure side, the annular projection having a tip positioned closer to the pressure side than a center in a width direction of the fitting groove, wherein
   a size of the first linearly tapered surface in the width direction of the fitting groove is smaller than a size of the second linearly tapered surface in the width direction of the fitting groove.

2. The sealing structure according to claim 1, wherein the cylindrical resin gasket is mounted at a position closer to the pressure side within the fitting groove, and a clearance is provided between a side wall surface on the non-pressure side of the fitting groove and the cylindrical resin gasket in a state in which no pressure is acting from the pressure side.

3. The sealing structure according to claim 1, wherein the fitting groove has a side wall surface constituted of a surface perpendicular to a center axis of the cylindrical resin gasket on the pressure side.

4. An assembling method of the sealing structure according to claim 1, the method comprising:
   mounting the cylindrical resin gasket in the fitting groove such that, after the cylindrical resin gasket is fitted onto the installation component from the pressure side, the cylindrical resin gasket is slid toward the fitting groove up to a position where an end face, which is on the pressure side, of the cylindrical resin gasket passes a side wall surface, which is on the pressure side, of the fitting groove; and
   installing the installation component having the cylindrical resin gasket mounted thereon in the mounting hole of the mounting destination member.

5. The sealing structure according to claim 1, wherein the cylindrical resin gasket is deformed to conform to at least portions of both the first linearly tapered surface and the second linearly tapered surface.

6. The sealing structure according to claim 1, wherein at least a portion of the cylindrical resin gasket is disposed on an apex of the tip of the annular projection.

7. The sealing structure according to claim 1, wherein the fitting groove has opposing side wall surfaces that extend perpendicular to an axis of the cylindrical resin gasket, wherein each of the opposing side wall surfaces intersect a respective one of the first linearly tapered surface and the second linearly tapered surface.

* * * * *